(No Model.)

W. H. BICKELHAUPT.
Combination Tool.

No. 241,594. Patented May 17, 1881.

WITNESSES:
C. Neveux
C. Sedgwick

INVENTOR:
W. H. Bickelhaupt
BY Munn & Co
ATTORNEYS.

UNITED STATES PATENT OFFICE.

WILLIAM H. BICKELHAUPT, OF NEW YORK, N. Y.

COMBINATION-TOOL.

SPECIFICATION forming part of Letters Patent No. 241,594, dated May 17, 1881.

Application filed April 6, 1881. (No model.)

*To all whom it may concern:*

Be it known that I, WILLIAM HENRY BICKELHAUPT, of the city, county, and State of New York, have invented a new and Improved Combination-Tool, of which the following is a full, clear, and exact description.

The object of my invention is to provide a new and improved tool for handling, opening, closing, and scraping boxes, barrels, bales, &c.

The invention consists in a hook attached to a transverse handle, with a hammer-head at one end and a claw at the other end, which hook is provided with a scraping-knife projecting in the opposite direction of the hook.

Figure 1:
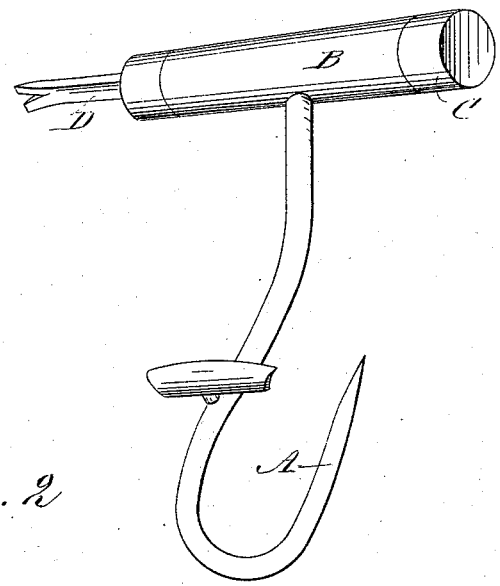
Figure 3:
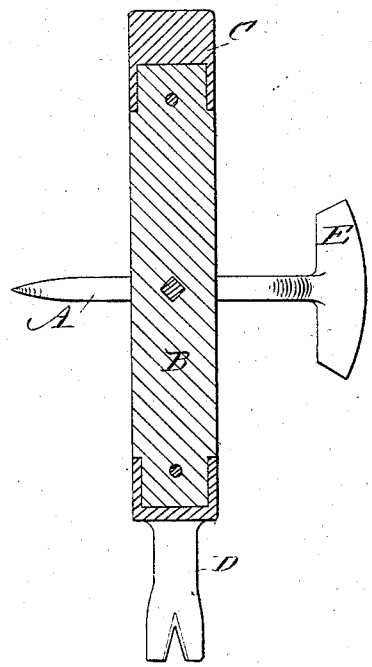
Figure 2:
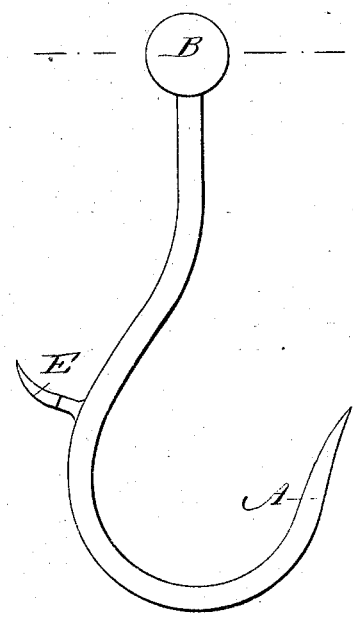

In the accompanying drawings, Figure 1 is a perspective view of my improved combination-tool. Fig. 2 is a side elevation of the same. Fig. 3 is a horizontal longitudinal sectional view of the handle.

Similar letters of reference indicate corresponding parts.

The hook A is attached to a transverse handle, B, provided at one end with a hammer-head, C, and at the other end with a sharp-edged claw, D. A scraping-knife, E, which projects in the direction opposite to that of the hook, and is slightly curved toward the handle, is attached to the shank of the hook at or near the middle of the same.

The hook is used, like an ordinary stevedore's hook, for handling boxes, barrels, bales, &c.

The claw D is used to remove the lid and heads of barrels and boxes. The hammer-head C is used to drive nails, and for similar purposes, and the scraping-knife E is used to scrape addresses and other marks from the sides of boxes, barrels, &c.

In using the scraper the handle B is held in the right hand, and the left hand is placed into the crook of the hook.

Having thus described my invention, what I claim as new, and desire to secure by Letters Patent, is—

1. A hook for handling boxes and bales, made substantially as herein shown and described, with a scraping-knife attached to the shank of the hook, as set forth.

2. The combination, with the hook A, of the scraping-knife E, the handle B, and the hammer-head C at one end of the handle, substantially as herein shown and described, and for the purpose set forth.

3. The combination, with the hook A, of the scraping-knife E, the handle B, the hammer-head C, and the claw D, attached to the ends of this handle, substantially as herein shown and described, and for the purpose set forth.

4. The handle A of a hook for handling boxes or bales, constructed substantially as herein shown and described, with a hammer-head at one end and a claw at the other end, as set forth.

WILLIAM H. BICKELHAUPT.

Witnesses:
OSCAR F. GUNZ,
C. SEDGWICK.